Aug. 18, 1959    J. B. OSBORNE ET AL    2,900,329
MOVEMENT OF FLUIDIZED CATALYST IN A STANDPIPE
Filed June 4, 1954
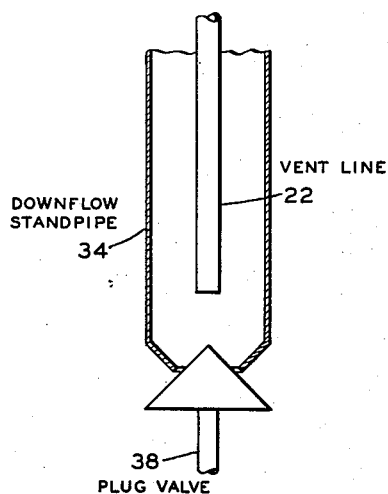
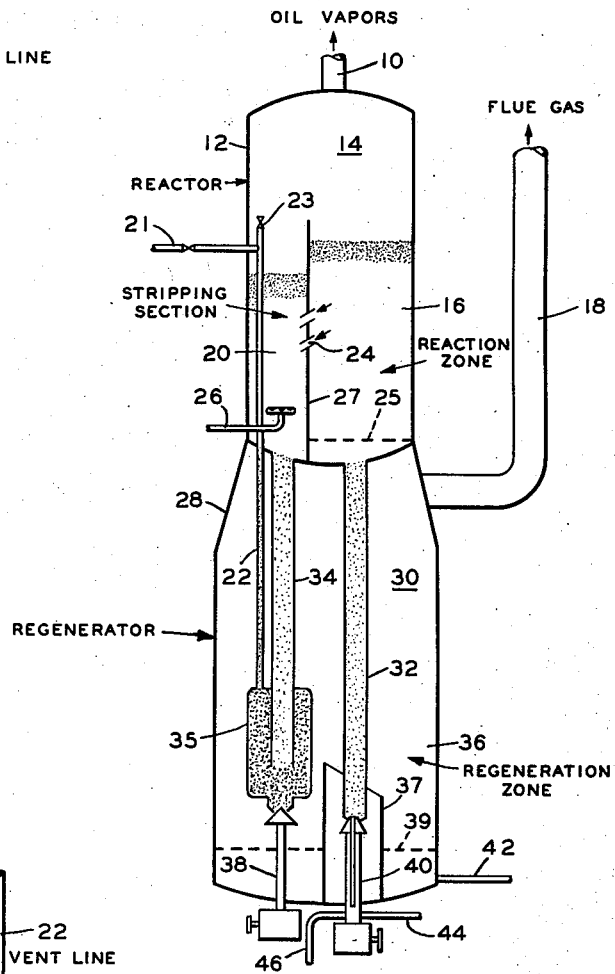
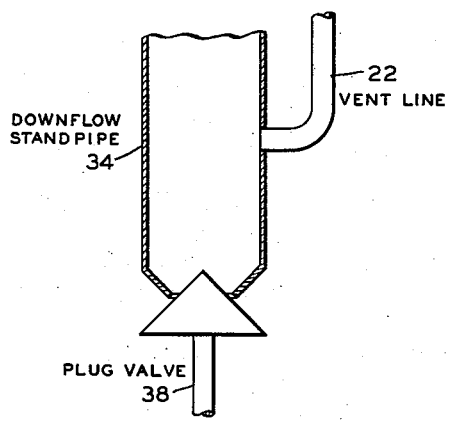
INVENTORS
JOHN B. OSBORNE
JAMES L. PATTON
BY
A. H. Palmer
ATTORNEY

United States Patent Office 2,900,329
Patented Aug. 18, 1959

2,900,329

MOVEMENT OF FLUIDIZED CATALYST IN A STANDPIPE

John B. Osborne, South Orange, and James L. Patton, Ramsay, N.J., assignors to The M. W. Kellogg Company, Jersey City, N.J., a corporation of New Jersey Application June 4, 1954, Serial No. 434,378

10 Claims. (Cl. 208—164)

This invention relates to method and means of improving standpipe operation in a fluid hydrocarbon conversion process. More particularly, it relates to method and means of decreasing erosion and increasing the static pressure in a standpipe used in a fluid hydrocarbon conversion process.

In the operation of catalytic cracking units, catalyst standpipes have shown a great degree of inconsistency with regard to static pressure developed. In some units, the expected static pressure has been attained. However, in many cases, the static head reached in actual standpipe operation has been much lower than design. In addition, numerous cases of severe erosion have occurred, particularly in the lower portion of the standpipes. Tests have indicated a difference in catalyst density in the lower and upper sections of standpipes co-existing with a normal pressure gradient in the upper section and with the lower section, usually from ½ to ⅓ of the total standpipe, having little or no pressure gradient.

It is possible to relate all of these phenomena by considering that a vapor space rather than a uniform mass of dense phase catalyst exists in the lower portion of the standpipe. According to one theory, this vapor space exists as a gas bubble completely filling a portion of the standpipe with a build-up or bridging of catalyst above the bubble. When the weight of catalyst build-up increases to a certain point, a high velocity stream of catalyst breaks through the bubble and jets downward to a shallow bed above the slide valve impinging on the wall of the standpipe and causing erosion. This breaking through process may be continuous or it may be intermittent. The bubble may be composed of hydrocarbon gases formed by the cracking of unstripped oil adsorbed by the catalyst or entrained with the catalyst, or it may simply be composed of vaporized oil, adsorbed or entrained thereon. With an increase in catalyst flow rate, the bubble becomes larger, decreasing the effective depth of the dense phase in the standpipe and resulting in a decrease in pressure build-up. With a continuing increase in catalyst flow rate, presumably a point would be reached where the standpipe velocity would be sufficient to sweep the bubble downward through the valve and the catalyst density in the standpipe would increase to the anticipated value. Similarly there is doubtless a very low standpipe velocity which would allow the gas to escape upward. In commercial units, however, neither the high velocity nor the low velocity required to remove the bubble from the standpipe occur in the normal operating range but are near the limits of design velocity.

According to another theory, the gas bubble does not completely fill the standpipe. Instead catalyst flows continuously down the inside wall of the standpipe and the bubble occupies only the inner portion. As the bubble size increases gradually, it occupies an increasingly greater length of the standpipe. During this bubble build-up period, the plug valve automatically opens to compensate for the lower pressure drop which results from low standpipe density. Finally, when the remaining catalyst in the bottom of the standpipe has been discharged through the plug valve, the air bubble passes through the wide open valve in a rush that causes a surge in the system.

During the period in which the bubble is building up in the standpipe, the downflowing catalyst must pass through a much restricted area due to the partial plugging effect of the bubble. The high velocities of catalyst flow around the bubble together with the turbulence which results and the "bouncing" which occurs each time a bubble passes through the plug valve all combine to cause erosion of the wall of the lower section of the standpipe.

It is an object of this invention to increase the static head in a fluid contact material standpipe.

It is another object of this invention to decrease erosion in a fluid contact material standpipe.

It is still another object of this invention to provide method and means of increasing fluid contact material circulation through a standpipe.

It is yet another object of this invention to provide method and means of releasing trapped gases in a fluid contact material standpipe.

It is also an object of this invention to provide method and means for obtaining uniform flow of catalyst through a standpipe without pressure surges which result from variations in standpipe density.

These and other objects will become more apparent from the following detailed description and discussion.

This invention comprises method and means of venting trapped gases from the lower portion of a standpipe used for the transfer of fluidized solid material from one vessel to another. In another aspect, it comprises method and means of venting entrapped gases from a standpipe used for the transfer of a fluidized catalyst from a hydrocarbon conversion zone to a regeneration zone.

The method of this invention is particularly applicable in fluid catalytic cracking processes. However, it may also be used in other fluid hydrocarbon processes such as those involving dehydrogenation, hydrogenation, desulfurization, aromatization, hydroforming, hydrocracking, alkylation, polymerization, condensation, etc.

In a typical fluid catalytic cracking process, a hydrocarbon oil is contacted in a conversion zone with a fluidized catalyst at a temperature between about 750° F. and 1100° F., or more usually, at a temperature between about 850° and 1025° F. The pressure in the conversion zone is maintained between about ½ atmosphere and about 50 pounds per square inch gauge, with the preferred pressure being between about 1 atmosphere and about 20 pounds per square inch gauge. The catalyst to oil ratio varies between about 1 and about 20 pounds of catalyst per pound of oil, the preferred ratio being between about 2 and about 12 pounds per pound. To provide a sufficient holding time in the conversion zone, the weight space velocity is maintained between about 0.1 and about 10 pounds of oil per hour per pound of catalyst, or more usually, between about 0.5 and about 5 pounds of oil per hour per pound of catalyst.

The catalytic cracking catalyst usually comprises one or more of the metal oxides selected from the group including titania, boria, zirconia, alumina, magnesia, etc., in combination with silica. Also useful are natural catalysts such as acid treated clays, for example, superfiltrol, etc. Contact material used in the fluid systems other than catalytic cracking may be an inert material such as sand, pumice, coke, Carborundum, etc. or it may have catalytic properties useful in the processes mentioned above. The contact material in all fluid systems usually will be sized between about 1 and about 150 microns with between about 20 and about 80 microns being preferred.

The hydrocarbon oil feed is preferably a mixture of light and heavy gas oils in the gravity range between about 20 and about 45 API, however, the feed may also include catalytic cracking recycle stocks, thermal recycle stocks or other heavy refinery stocks. In general, the only limitations are that the total hydrocarbon oil feed has a maximum Conradsen carbon residue of about 0.6. The feed may be preheated or it may be introduced into the conversion zone without preheat. If preheat is desired it may be obtained either by conventional indirect heat transfer or by passing the feed through conventional fired heaters, the temperature after preheat usually being between about 300° F. and about 800° F. The conversion takes place in a dense fluidized bed of catalyst, having a density between about 15 and about 45 pounds per cubic foot, and maintained in a turbulent state by the hydrocarbon vapors and by the addition of steam or other inert gas, such as nitrogen, carbon dioxide, flue gas, etc. During the conversion process, carbon or coke is deposited on the catalyst particles. To maintain the activity of the catalyst, regenerated catalyst is continuously introduced into the conversion zone and a corresponding amount of spent or carbon contaminated catalyst is withdrawn therefrom. The withdrawn spent catalyst is passed through a stripping section for the removal of adsorbed or entrained hydrocarbons and then is passed into a regeneration zone.

The regeneration also takes place in a turbulent dense fluidized bed of catalyst, having a density between about 20 and about 50 pounds per cubic foot, and the combustion and the removal of carbon from the catalyst is effected by the admission to this bed of oxygen or an oxygen containing gas. The temperature in the regeneration zone is maintained between about 800° and about 1500° F., more usually between about 1050° F. and about 1200° F., and the pressure therein is maintained between about ½ atmosphere and about 50 pounds per square inch gauge. After regeneration the catalyst is introduced into the conversion zone at a rate sufficient to maintain the desired temperature and is held for sufficient time to product catalytic reaction therein, as previously mentioned.

In a system of the type illustrated in Figure I, movement of catalyst downward from the reaction zone to the regeneration zone and from the regeneration zone to the reaction zone is effected by passing the catalyst in a fluidized state through a confined, elongated zone commonly called a standpipe, wherein the total pressure is increased by the fluid static pressure developed by the catalyst thus enabling the catalyst to be circulated between processing zones via transfer lines. When an upward movement of catalyst is required, as for example, when regenerated catalyst is passed from a regeneration zone to a conversion zone at a higher elevation, the driving force required is supplied by a compressed fluidizing medium introduced into the standpipe at a pressure sufficient to overcome the pressure drop in the standpipe plus the pressure in the reaction zone. To prevent the flow of this fluidizing medium into the regeneration zone it is necessary to maintain a pressure higher than the pressure of the fluidizing medium at the point where the catalyst is entrained. This may be accomplished by maintaining the regeneration zone at a higher pressure than the reaction zone or by maintaining a static head of catalyst above the catalyst entrainment point sufficient to counteract the pressure of the fluidizing medium. Usually the pressure in the regeneration zone will be at least equal to the pressure in the reaction zone. In the passage of spent catalyst downward from the conversion zone to the regeneration zone, it is necessary to overcome the friction loss in the downflow standpipe and the differential pressure between the two zones, if any. In this case, the driving force required is supplied by the static head of fluidized catalyst in the downflow standpipe. Anything which serves to decrease the catalyst density in any portion of the standpipe, namely accumulated gases, has a detrimental effect on the standpipe operation and decreases the maximum catalyst circulation through the standpipe.

In the method of this invention means is provided for venting accumulated vapors from the bottom portion of the downflow standpipe. In one embodiment of this invention, the venting means comprises a vapor disengaging zone or vapor trap and a small vent conduit. As the catalyst passes downward through the standpipe, vapors entrained with or released from the catalyst enter the vapor trap and pass upward and out of the trap through the vent conduit and back to the stripping section of the reactor.

Because of the increased cross-section offered to vapor flow within the vapor trap the catalyst therein tends to become compacted into a more dense bed which offers a resistance to the escape of catalyst upward through the vent conduit. However, the difference in catalyst density resulting from the increased cross-section is not sufficiently great to prevent the escape of some catalyst through the vent line unless the vapor trap is constructed of a height approaching that of the downflow standpipe. Although this would be possible, the amount of catalyst recycled with proper regulation of vapor flow through the vent conduit is not sufficient to warrant such an installation. Normally, the concentration of catalyst in the vented vapors is between about 1% and about 25% of the catalyst concentration in the downflow standpipe. The quantity of vapor vented is controlled by restricting the size of the vent conduit or by placing one or more restriction orifices or a block valve therein. Any of these methods provides a positive flow control; however, the block valve is by far preferable. When a small conduit is used or one containing a restriction fixed in size there is a very great tendency for catalyst plugging. The use of a larger conduit in conjunction with a block valve provides for better flow control and minimizes the plugging problem. In conjunction with any of these systems, it is desirable to have a connection whereby an aerating medium, usually steam, is admitted to the vent conduit either for purposes of continuous aeration to prevent catalyst plugging or to remove the blocking catalyst if plugging occurs.

Usually the diameter of the vapor trap varies between about 1.1 and about 2 times the diameter of the catalyst downflow standpipe and in length it varies between about 0.1 and about 0.5 times the length of the downflow standpipe. The vapor trap is located at any level in the lower portion of the standpipe, preferably between about 1 foot and about 15 feet from the bottom outlet of the standpipe.

In another embodiment of this invention the venting means comprises a small conduit lying entirely within the downflow standpipe and extending upward from the lower portion of the downflow standpipe into the dispersed phase portion of the reaction zone. As the catalyst passes downward through the downflow standpipe, vapors entrained with or released from the catalyst enter the vent conduit and pass upward into the reactor. In this embodiment no disengaging zone is present to restrict catalyst recycle through the vent means. To control the flow of vapor and catalyst through the vent conduit and to minimize the cross-sectional area in the downflow standpipe displaced by the vent line, the cross-sectional area of the vent line is held to a minimum, preferably between about 0.1 and about 5% of the cross-sectional area of the downflow standpipe. With the vent line so restricted, the concentration of catalyst in the vented vapors is between about 1% and about 25% of the catalyst concentration in the downflow standpipe.

In still another embodiment of this invention the venting means comprises a small conduit lying outside of the downflow standpipe but connected thereto through an opening in the wall of the lower portion of the standpipe and extending therefrom to the dispersed phase portion of the reaction zone. In this arrangement the size of the vent conduit does not limit the effective cross-sectional area within the downflow standpipe and therefore the conduit may be varied in size without affecting the catalyst circulation. It is still desirable, however, to limit the flow of catalyst through the vent conduit to the amount specified in the previous embodiment and it also preferably has a cross-sectional area between about 0.1 and about 5% of the cross-sectional area of the downflow standpipe.

In both embodiments of this invention which comprise a vent conduit only, the vent conduit is located between about 1 and about 15 feet from the bottom of the downflow standpipe. As mentioned before, control of vapor and catalyst flow through the vent conduit need not be accomplished by restricting the size of the entire vent conduit as the same result may be obtained by placing one or more restriction orifices in the vent means or by placing a block valve therein. In addition both of these arrangements may include an aeration connection for the purposes described in conjunction with the operation of the vapor trap embodiment.

The vapors removed from the standpipe are usually vented to the stripping section of the reactor. However, they may be vented elsewhere, for example, to the reaction zone, to a recovery system, to the atmosphere, etc., and still be within the scope of this invention.

It should be understood that the various methods and means of practicing the present invention are not equivalent in efficacy. The particular embodiment of this invention which comprises a disengaging space in addition to a vent conduit is preferred over the simple vent conduit:

(a) Because in the former less catalyst passes from the standpipe through the vent line and (b) Because the substantially increased cross-section provided by the disengaging space allows the catalyst to compact or increase in density, thereby releasing an additional amount of vapors through the vent line.

In order to more fully explain the invention, reference may be had to the specific embodiment thereof presented in the accompanying drawings, of which Figure 1 is a diagrammatic illustration of a reactor and regenerator, used in catalytic cracking, drawn in elevation and in cross-section and Figures 2 and 3 are alternate arrangements for standpipe venting.

A hydrocarbon oil having an API gravity of about 30° is preheated to about 500° F. and admitted through conduit 44 into a conventional hollow-stem plug valve 40, the plug portion of which is located inside the bottom of a regenerator vessel 30. At the same time steam is admitted into the same hollow-stem plug valve through conduit 46. Hot regenerated silica-alumina catalyst from the dense phase bed 36 overflows the regenerated catalyst well 37 and it is entrained with the mixture of steam and oil feed leaving the plug valve. The combined oil-steam-catalyst mixture flows upward through the cylindrical upflow conduit 32. The hot catalyst contains sufficient heat to vaporize the oil almost immediately after it leaves the plug valve 40. The velocity of the oil-steam-catalyst mixture in conduit 32 may vary between about 15 and about 60 feet per second. However, in the specific illustration, a velocity of about 30 feet per second is used.

The upper part of the upflow conduit 32 is connected with the bottom of an elongated cylindrical reactor 12. The space within the reactor 12 is divided into two parts by a tranverse plate 27 which extends from the bottom of the reactor upward approximately ½ of the inside height of the reactor. A dense fluidized mass of catalyst 16 is maintained within the larger compartment formed by the transverse plate 27. Supporting this dense phase bed 16 is a conventional high temperature grid 25 constructed of a metal alloy or other heat resistant material and the oil-steam-catalyst mixture enters the reactor 12 below this grid. The grid 25 serves not only as a support but acts as a distributor for the oil-steam-catalyst mixture.

The dense phase bed of catalyst 16 in the reactor 12 may be maintained at various levels, up to the point where the catalyst overflows the tranverse plate 27. The catalyst level is controlled by conventional means, usually by controlling the catalyst circulation through conduit 34. The dense phase bed 16 has a density of about 30 pounds per cubic foot. Due to the larger cross-section of the dense phase zone the vapor velocity therein is much lower than in the upflow conduit 32. Velocities between about 0.1 and about 5 feet per second are not unusual, however, in this illustration the velocity is about 2.5 feet per second.

The oil resides within bed 16 for a sufficient period of time to obtain the desired conversion, about 10 seconds. The temperature within the dense phase bed 16 is maintained at about 900° F. and the reactor pressure is maintained at about 10 pounds per square inch gauge. The converted oil vapors and steam pass out of the dense phase bed 16 into the upper portion 14 of the reactor 12. This portion of the reactor 12 is usually designated as the dispersed or lean phase because of the low concentration of catalyst therein. The concentration of catalyst in zone 14 varies in density and may be as low as 0.001 pound of catalyst per cubic foot. Catalyst is removed from the reaction gases and steam in conventional cyclones or other conventional separating equipment (not shown) and is returned to the dense phase bed 16. The converted oil vapors and steam leave the reactor 12 through conduit 10 for further processing and separation.

The conversion process which takes place in the dense phase zone 16 is accompanied by the formation of carbon which is deposited on the catalyst, thereby lowering its activity. To restore the effectiveness of the spent or carbon contaminated catalyst it is necessary to remove the carbon, usually by combustion. As a step in the accomplishment of this purpose, the spent catalyst passes from the reaction zone 16 through the transverse plate 27 into the stripper section 20 of the reactor 12. The passage is made through conventional, shielded, horizontal slots 24 in the transverse plate 27. The slots 24 are located at more than one elevation so that the reactor 12 may operate when filled with catalyst to various depths. However, the slots 24 are located sufficiently low so that they are always below the upper level of the dense phase bed in the reactor section. The slots 24 are shielded with baffles from upflowing vapors to prevent crossover of gases between the two zones. If the capacity of the slots 24 is exceeded, excess spent catalyst from the reaction zone overflows the longitudinal plate 27 into the stripper section 20.

Absorbed or entrained hydrocarbon liquids or vapors are stripped from the spent catalyst as it passes downward through the stripper section 20. The stripping is accomplished by the admission of a gasiform agent, specifically steam, into the bottom of the stripper section 20 through conduit 26, the steam being distributed by means of a conventional perforated ring or by other conventional means. Stripped spent catalyst passes downward from the stripper section 20 to the regenerator 28 through a vertical cylindrical standpipe 34 which terminates below the level of the dense phase bed of regenerated catalyst 36. The flow of spent catalyst through standpipe 34 is controlled by a conventional plug valve extending upward through the bottom of reactor 28 and into the end of the standpipe. In the lower portion of the standpipe 34 there is an expanded elongated vapor disengaging section 35, in the form of an inverted pocket, which may be designated as a vapor trap. Standpipe 34 extends downward within the expanded section 35 for a distance of about 75% of the length of the trap. The standpipe 34 continues on downward from the bottom portion of the trap 35 for a short distance to plug valve 38.

The vapor trap 35 may be of any shape but it is preferably circular in cross-sectional area. It may be constructed of the same material as the standpipe or of other materials which will withstand the conditions of temperature and pressure encountered. The primary requisite of the trap 35 is that it supply an expanded space from which the vapor seal or bubble may be released.

In the specific embodiment shown, the standpipe 34 extends downward within a cylindrical trap 35 for a distance as previously described. The purpose of this is to provide a space for entrapped vapors to be disengaged from the dense phase catalyst in the vapor trap 35. The diameter of the enlarged cylindrical section 35 is about 1.5 times the diameter of the standpipe it encompasses. The distance from the bottom of the standpipe 34 to the bottom of the vapor trap 35 is about 4 feet and the length of the trap 35 measured along the axis of standpipe 34 is about 0.2 times the length of the standpipe.

Extending upward from the vapor trap 35 outside of and parallel to the standpipe 34 is a vent conduit 22 which continues upward into the stripper section 20 of the reactor 12 and on through the stripper section into the dispersed phase 14. This conduit, which is about 2 inches in diameter is large enough to accommodate any vapors which enter the trap 38. As the catalyst leaves the standpipe and enters the vapor trap the increased cross-section of flow causes a decrease in vapor velocity and an increase in the density of flowing catalyst. The static head developed by the catalyst in the standpipe 34 forces a portion of flowing catalyst upward in the trap above the outlet of the standpipe. With a trap of sufficient height a point is reached where the head in the trap equals the head in the standpipe and there results a dense phase bed with a distinct level similar to the bed in the stripping section 20 of the reactor. Because of the greater density of the catalyst in the trap, each foot of trap height is equivalent in static head to more than a foot of standpipe height. Thus with a trap of sufficient height, practically no catalyst is recycled through the vent conduit 22. In the operation of commercial units, however, the difference in density between the two catalyst masses is small and construction of a vapor trap high enough to substantially eliminate catalyst recycle is neither economical nor desirable. Fortunately, the amount of vapor which must be vented is small and this in itself limits the amount of catalyst recycled when vapor flow through the vent conduit is properly regulated.

As mentioned in the previous discussion more than one method is available for controlling the amount of vapor passing through the vent conduit 22, including restricting the conduit size or installing a restriction orifice or a block valve in the conduit. The latter method is preferable since a restricted conduit tends to plug with catalyst and one containing an orifice is further unsatisfactory because of the tendency of the orifice to enlarge due to erosion. A block valve accomplishes the same purposes as other types of restrictions and at the same time it provides positive, variable flow control.

Whichever system of flow control is used it is desirable to supply a means of removing catalyst from the vent line if plugging occurs. This is conveniently provided in the form of a connection to the vent conduit whereby steam or other inert gas may be admitted at pressures exceeding the pressure in the reactor 12 or regenerator 28. This connection serves the further purpose, when properly located, of providing an aeration medium for the continuous or intermittent aeration of the vent conduit 22. Although the location of the block valve and aeration connection may be varied, in this specific illustration the block valve 23 is installed at the upper terminus of vent conduit 22 with the aeration conduit 21 being located below and adjacent thereto. If continuous aeration is desired the inert gas is preferably connected near the point where the vent conduit 22 leaves the vapor trap 35. In conjunction with this vent block valve 23 may also be relocated, preferably near the aeration connection.

For convenience, because of the physical arrangement of the reactor and regenerator, the vent conduits illustrated and discussed are situated within the process vessels. For this reason provision is made for external operation of the block valve 23 and means for counteracting expansion of the vent line (not shown) is provided. Alternate arrangements in which the block valve and/or the vent conduit are located outside of the reactor and regenerator may also be used, particularly where the process scheme would make such an arrangement desirable. For maintenance purposes the latter type of installation is usually preferred. In this particular embodiment of the invention the vent conduit 22 is vented to the stripping section 20 of the reactor 12, however other arrangements, such as venting to the reaction zone, to another vessel, to a flare, or to the atmosphere are equally within the scope of this invention.

The spent catalyst from standpipe 34 passes into a dense phase bed 36 of regenerated catalyst. The oxygen required for the combustion of the carbon deposited on the catalyst is admitted to the regenerator 28 through conduit 42 in the form of air or other oxygen containing gases. A horizontal grid 39 composed of a temperature resistant metal alloy or other conventional high temperature refractory provides a support for the regenerated catalyst and also serves as a distributor for the air or other oxygen containing gases. Above this grid 39 there is maintained a dense turbulent bed 36 of regenerated catalyst similar in characteristics to the previously described dense phase bed 16 in the reactor 12. The air or other oxygen containing gases pass upward through the grid 39 and into the dense phase bed 36 where the combustion reactions take place. Surrounding the upflow standpipe 32, previously described, there is a cylindrical regenerated catalyst well 37 which extends upward a sufficient height above the outlet of standpipe 34, and it is so constructed to prevent the entrance of spent catalyst into the said well. The regenerated catalyst entering the well 37 is combined with the hydrocarbon oil feed and steam as previously described.

The space within the regenerator 28 above the dense phase bed 36 of regenerated catalyst is similar to the dispersed phase bed 14 in the reactor 12 previously described. Such catalyst as may be entrained by the combustion of flue gases leaving the dense phase bed 36 is removed by conventional cyclones or by other conventional separation methods (not shown) and is returned to the dense phase bed 36. The flue gases are removed from the regenerator 28 through conduit 18 and are discharged to the atmosphere.

The catalytic cracking process illustrated is only one typical arrangement which may be used in the method of this invention. Also within the scope of the invention are various other process flows including:

(1) A vessel arrangement similar to the illustration and having internal standpipes, but with the reactor on the bottom and the regenerator on top, (2) A balanced pressure unit with a separate reactor and regenerator side by side and connected by external standpipes, (3) Stacked units with separate vessels, one above the other, either the reactor or the regenerator being on top and connected by external standpipes, etc.

The vapor trap arrangements shown in Figures 1, 2 and 3 and previously discussed, are illustrative of typical means for carrying out the purpose of the invention. The venting of a portion of the gaseous material from the fluidized catalyst in the standpipe at an intermediate point along the length thereof is intended for the purpose of this specification and appended claims to designate generally an operation involving simple venting and one in which the fluidized catalyst first flows into the upper portion of the standpipe, then the disengaging means or vapor trap and finally through the lower portion of the standpipe. Other apparatus which will accomplish the same result may also be used within the scope of this invention.

As mentioned previously, it is not intended that this invention be limited to catalytic cracking. It will find application in any fluid hydrocarbon conversion process where a similar problem exists.

Having described the present invention by reference to a specific application thereof, it should be understood that no undue limitations or restrictions should be imposed by reason thereof, but that the scope of the invention is defined by the appended claims.

We claim:

1. A method for transferring finely divided contact material from an upper hydrocarbon conversion zone containing a dense fluidized bed of finely divided contact material therein to a lower regeneration zone containing a dense fluidized bed of contact material therein which comprises forming an elongated confined column of downwardly moving contact material extending from said hydrocarbon conversion zone to the lower portion of said regeneration zone, whereby an increase in fluid static pressure in the direction of flow of said downwardly moving column of contact material is provided and maintaining the column as a continuous bed of contact material by venting gaseous material from within the lower portion of the column for flow to said hydrocarbon conversion zone through a separate elongated confined column associated therebetween.

2. In a hydrocarbon conversion process wherein a hydrocarbon feed material is passed in contact with a fluidized bed of catalyst to convert said hydrocarbon feed into desired products thereby contaminating the catalyst and the contaminated catalyst is stripped of volatile reaction products in a stripping zone and the stripped catalyst is removed from said stripping zone as a downwardly moving elongated confined stream of catalyst for transfer to a regeneration zone wherein catalyst contaminants are removed from the catalyst by burning in the presence of an oxygen containing gas to regenerate the catalyst and the regenerated catalyst is returned to the conversion zone, the improved method of operation to maintain a relatively dense fluidized bed of catalyst moving continuously downwardly as an elongated confined stream which comprises venting the lower portion of the elongated confined stream with said conversion zone for the separate flow of accumulated gaseous material from within the lower portion of the elongated confined stream to said conversion zone.

3. In a process for the conversion of hydrocarbons employing a dense fluidized bed of catalyst in a reaction zone, a stripping zone and a regeneration zone wherein the catalyst is passed from the reaction zone to the stripping zone for removal of occluded reaction products from the catalyst with a stripping gas and the stripped catalyst is removed from the stripping zone as a downwardly moving relatively dense phase confined stream of catalyst for transfer to the regeneration zone, the improvement for maintaining the downwardly moving stream of catalyst as a continuous relatively dense phase throughout the length thereof which comprises venting the lower portion of said stream with the upper portion of said stripping zone for the flow of gaseous material substantially free of entrained catalyst material as a separate confined stream.

4. A method for transferring finely divided contact material from a hydrocarbon conversion zone containing a dense fluidized bed of finely divided contact material to a regeneration zone containing a dense fluidized bed of contact material therein which comprises passing contact material downwardly as an elongated confined column from said conversion zone controlling the rate of contact material discharged from the bottom of the column, introducing a gaseous material to the upper portion of said column of downwardly moving contact material, venting the lower portion of said column with the upper portion of said conversion zone for flow of vaporous material from the lower portion of the column to said conversion zone and transferring contact material discharged from the bottom of the column to said regeneration zone.

5. A method for passing finely divided contact material from a zone of relatively low pressure to a zone of relatively high pressure which comprises forming an elongated confined column of downwardly moving contact material extending downwardly from said zone of low pressure to provide an increase in fluid static pressure in the direction of flow sufficient to overcome the pressure differential between the zone of relatively low pressure and the zone of relatively high pressure, maintaining the column as a continuous downwardly moving relatively dense bed of contact material throughout the length thereof by venting gaseous material from the lower portion of the column to the zone of relatively low pressure and passing contact material from the bottom of said column to said zone of relatively high pressure.

6. A method for transferring finely divided contact material from an upper relatively low temperature zone to a lower relatively high temperature zone which comprises passing finely divided contact material downwardly as a relatively dense fluid bed of contact material through an elongated confined column from the upper portion of said low temperature zone, controlling the rate of discharge of contact material from the bottom of said column, introducing a gaseous material into the upper portion of said downwardly moving confined column of contact material and withdrawing a gaseous material from the lower portion of said confined column prior to discharge of the contact material from the bottom thereof, passing the withdrawn gaseous material to the upper portion of said low temperature zone as a separate confined stream and passing said contact material discharge from said column to said relatively high temperature zone.

7. An apparatus comprising in combination an upper chamber containing a dense fluidized bed of contact material therein, a lower chamber containing a dense fluidized bed of contact material therein, an open end substantially vertical first conduit extending downwardly from said upper chamber into said lower chamber, a vent conduit sealed from said lower chamber connecting the lower portion of said first conduit within said lower chamber with said upper chamber and being of smaller diameter than said first conduit.

8. An apparatus comprising in combination a first chamber and a second chamber, a substantially vertical open end first conduit extending downwardly from the lower portion of said first chamber into the lower portion of said second chamber, a second conduit of smaller diameter than said first conduit extending downwardly from the upper portion of said first chamber through said second conduit and terminating at a point above the bottom of said first conduit, a third open end conduit extending from the lower portion of said second chamber upwardly into the bottom of said first chamber, means for introducing vaporous material to the bottom of said third conduit for upward flow therein, means for removing a vaporous material from the upper portion of said first chamber, means for introducing a gaseous material to the lower portion of said second chamber, means for recovering a gaseous material from the upper portion of said second chamber and each of said chambers and said first and third conduits containing finely divided contact material therein.

9. A unitary vessel containing an upper reaction chamber and a lower regeneration chamber, each of said chambers containing a dense fluidized bed of contact material therein, an elongated first conduit extending upwardly from the lower portion of said regeneration chamber to the upper portion of said reaction chamber, the bottom of said first conduit terminating in a gaseous material disengaging chamber, the bottom of said disengaging chamber in open communication with said regeneration chamber to provide for flow of contact material from said reaction chamber downwardly through said first conduit to said disengaging chamber and thence into said regeneration chamber, a second conduit connecting the top of said disengaging chamber with the upper portion of said reaction chamber, a third open end conduit connecting the lower portion of said regeneration chamber with the bottom of said reaction chamber for passage of finely divided contact material upwardly therethrough, means for introducing a vaporous material to the bottom of said third conduit for upward flow therein, means for removing a vaporous material from the upper portion of said reaction chamber, means for introducing a gaseous material to the lower portion of said regeneration chamber and means for removing a gaseous material from the upper portion of said regeneration chamber.

10. An apparatus for transferring finely divided contact material from an upper low pressure chamber to a lower high pressure chamber, which comprises providing an elongated open end first conduit extending from the upper portion of said low pressure chamber to the lower portion of said high pressure chamber, a second conduit connected with the upper portion of said first conduit for the introduction of a gaseous material thereto, a third open conduit connected with the lower portion of said first conduit above the bottom thereof extending upwardly into the upper portion of said low pressure chamber, said third conduit containing valve means in the upper portion thereof for control of gaseous material through said third conduit and a fourth open end conduit extending from the lower portion of said high pressure chamber substantially vertically upwardly to said low pressure chamber.

References Cited in the file of this patent

UNITED STATES PATENTS

| | | |
|---|---|---|
| 2,378,542 | Edmister | June 19, 1945 |
| 2,391,336 | Ogorzaly | Dec. 18, 1945 |
| 2,509,983 | Morrow | May 30, 1950 |
| 2,671,102 | Jewell | Mar. 2, 1954 |
| 2,716,050 | Hagerbaumer | Aug. 23, 1955 |